May 15, 1956 N. W. PARKER 2,745,900

COLOR TELEVISION RECEIVER

Filed March 17, 1953

INVENTOR.
Norman W. Parker
BY
Norman L. Mueller
Atty.

United States Patent Office 2,745,900

Patented May 15, 1956

2,745,900

COLOR TELEVISION RECEIVER

Norman W. Parker, Park Forest, Ill., assignor to Motorola, Inc., Chicago, Ill., a corporation of Illinois Application March 17, 1953, Serial No. 342,817

6 Claims. (Cl. 178—5.4)

Figures 1, 2:
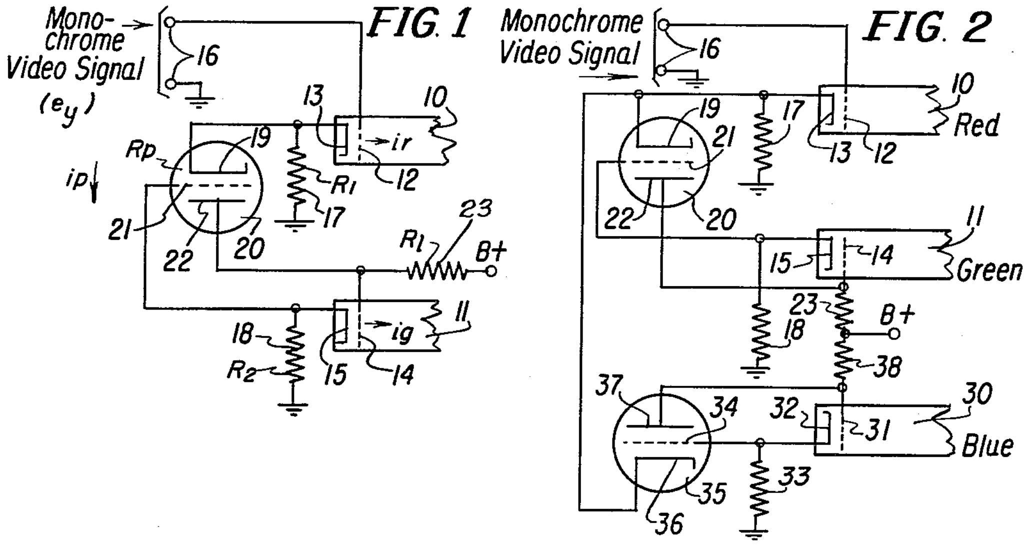

This invention relates to color television receivers, and more particularly to color television receivers of the type in which a plurality of cathode-ray image reproducing devices (contained in separate or in a single envelope) are used to reproduce an image in full color in response to a received color television signal.

One known color television system is referred to in present-day art as the "NTSC system," and this system is described in an article by C. J. Hirsch, et al., entitled "Principles of NTSC Compatible Color Television" at page 88 of Electronics magazine, published by McGraw-Hill Corporation, in the February 1952 edition. In this type of color television system, the transmitted color television signal includes monochrome ($y$) video information amplitude modulated on a picture carrier; and also includes two independent signals respectively representing blue and red color-difference information ($b—y$) and ($r—y$), these signals being amplitude modulated on two respective sub-carriers of like frequency but in phase quadrature with each other and amplitude modulated on the aforementioned picture carrier. It is usual also to include bursts of a reference signal in the television signal having the frequency of the subcarriers and the phase of one of them.

There is provided in each color television receiver in the NTSC system a cathode-ray image reproducing device for red color information, a cathode-ray image reproducing device for green color information, and a cathode-ray image reproducing device for blue information. As stated above, these devices may be in separate envelopes or all included in a common envelope. The monochrome ($y$) information is recovered from the NTSC color television signal and is applied to the control electrodes of the three image reproducing devices. The first color difference signal ($r—y$) is recovered from one of the aforementioned sub-carrier components and is applied to the cathode of the red reproducing device so that the resulting modulation on the cathode-ray beam therein is in accordance with red color information. Likewise, the second color difference signal ($b—y$) is recovered from the second sub-carrier component and is supplied to the cathode of the blue reproducing device so that the resulting modulation in the latter device is in accordance with blue color information. The two color difference signals referred to above are combined to produce a third green ($g—y$) color difference signal which is applied to the cathode of the green image reproducing device so that the resulting modulation in that device is in accordance with the green color information. The resulting color images appearing on the screens of the three reproducing devices are then combined optically to produce a picture in full color.

To prevent cross-talk in the NTSC system it has been found necessary to invert the phase of the ($r—y$) carrier from time to time, and this necessity has produced inherent disadvantages. To overcome these disadvantages, a color television system designated "Orange-Cyan" has been devised. The latter system is essentially similar to the former with the exception that the aforementioned like frequency and phase quadrature subcarrier components are modulated with signals representing orange color information and negative green (or cyan) information. With the orange-cyan system, the effects of cross-talk have been reduced to a minimum; and the need to invert the phase of either of the subcarriers has been obviated. Matrixes are provided in the orange-cyan color television receivers which utilize the orange and cyan signals, obtained by demodulating the subcarrier components, again to produce the ($b—y$), ($r—y$), ($g—y$) color difference signals for application to the three image reproducing devices referred to previously herein.

Both the NTSC and the orange-cyan systems are capable of reproducing black-and-white images when the color receiver is tuned to a monochrome television signal. This is possible since, when the receiver is tuned to a monochrome television signal, all three image reproducing devices are modulated solely by the monochrome ($y$) signal. When beams of the three devices each have a proper current intensity, the various color images produced by the reproducing devices result in a pure black-and-white image upon optical combination.

Difficulties have been encountered in receivers designed to operate in either of the above systems in maintaining the desired current relation between the beams in the three image reproducing devices so as to prevent color contamination in the reproduced color or monochrome images. It has been the practice to construct the system so that these devices operate independently of each other with their beam current intensities adjusted to different selected values by controlling, for example, the beam accelerating potential in each of the devices. Since there is no inter-control between the reproducing devices, it is a simple matter for one or more of the devices to become misadjusted (due, for example, to a variation in the mutual conductance of such device) so that it contributes an improper portion to the resulting image. This effect is manifested during monochrome reproduction by the resulting image appearing with either red, blue, or green contamination instead of true black-and-white; and in color reproduction the effect appears as color contamination with color image being reproduced with improper color hues. Even though precise control on the various reproducing device may be achieved for normal operation, the aforementioned color contamination still occurs during warm-up periods.

It is, accordingly, an object of the present invention to provide a color television receiver using a plurality of image reproducing devices, each for a particular color, which is constructed so that under all conditions each of the image reproducing devices contributes precisely its correct proportion of the color of the final reproduced image.

A further object of the invention is to provide an improved color television receiver which is capable of producing color or monochrome images that are not subject to color contamination even during warm-up periods of the receiver.

A feature of the invention is the provision of a color television receiver which utilizes a plurality of image reproducing devices for reproducing the various components of a color image reproduced by the receiver, and which includes a control network intercoupling the devices so that any variation in current flow through one of the devices from a selected value is reflected in the other devices to maintain the proportionate current flow in each of the devices essentially contant.

Figure 3:
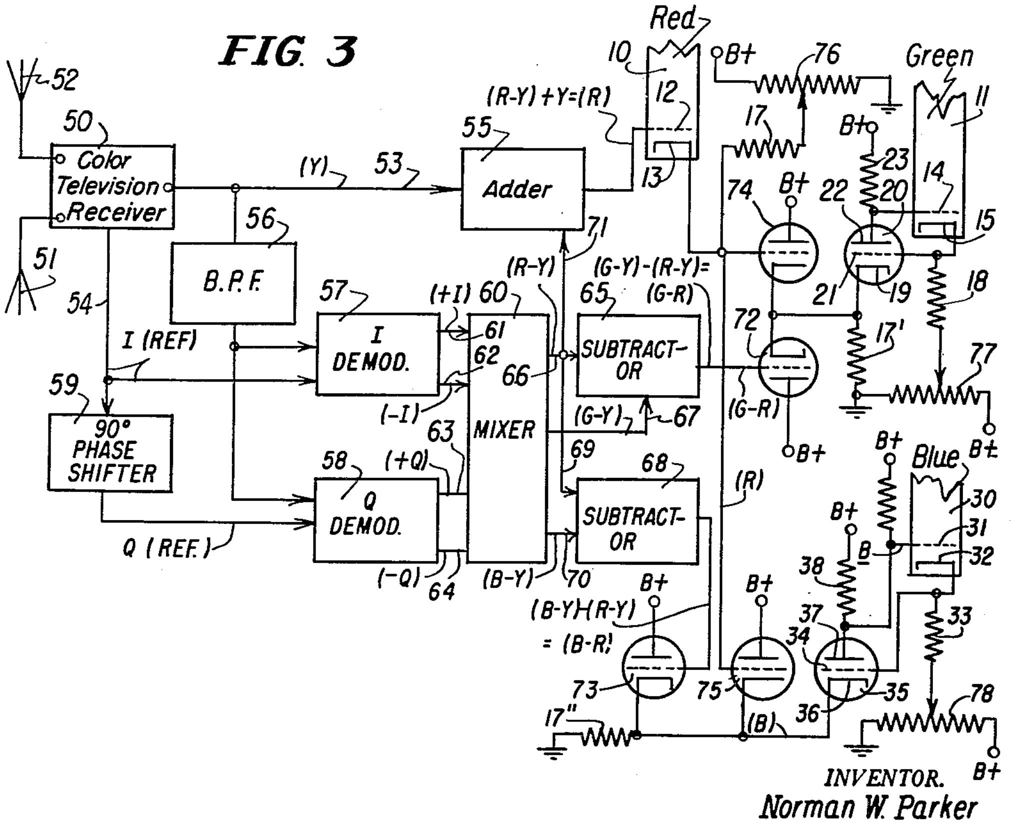

The above and other features of the invention which are believed to be new are set forth with particularity in the appended claims. The invention itself, however, together with further objects and advantages thereof may best be understood by reference to the following description when taken in conjunction with the accompanying drawings in which:

Figs. 1 and 2 are fragmentary circuit diagrams illustrating the principle of the invention, and Fig. 3 is a color television receiver constructed in accordance with the invention.

The television receiver of the invention is intended to utilize a modulated wave signal and comprises a reproducing means including at least two cathode-ray beam discharge devices. Means is included in the receiver for demodulating the aforesaid wave signal and for supplying a component of the resulting demodulated signal to one of the discharge devices to control the beam current therein, and a control network is coupled between the discharge devices to establish a beam current in the other of the devices having a selected proportionate relation with the beam current in the one device.

The circuit of Fig. 1 includes a first cathode-ray image reproducing device 10 and a second cathode-ray image reproducing device 11, of which only the electron gun portions of the devices have been illustrated. Device 10 includes a control electrode 12 and cathode 13, and device 11 includes a control electrode 14 and cathode 15. Devices 10 and 11 each contribute, for example, a different color component of a color image to be reproduced, and these devices may be separate and distinct or included in a single envelope. Control electrode 12 is connected to one of a pair of input terminals 16, the other input terminal being connected to a point of reference potential or ground.

Cathode 13 is connected to a point of reference potential or ground through a resistor 17, and cathode 15 is connected to ground through a resistor 18. Cathode 13 is also connected to the cathode 19 of an electron discharge device 20, device 20 having a control electrode 21 connected to cathode 15 of reproducing device 11 and having an anode 22 connected to the positive terminal B+ of a source of unidirectional potential through a resistor 23 and to the control electrode 14 of reproducing device 11.

When a monochrome signal ($e_Y$) is applied across terminals 16, current flow is established in reproducing device 10 which produces voltages and current in the circuit in accordance with the following relations, where:

$\mu$=amplification factor of device 20,
$i_r$=current flow through device 10,
$R_1$=resistance of resistor 17,
$i_g$=current flow through device 11,
$R_2$=resistance of resistor 18,
$i_p$=plate current of device 20,
$R_L$=resistance of resistor 23,
$K_1$=a constant,
$gm_g$=mutual conductance of device 11,
$l_g$=signal on control electrode 14.

$$i_p=\frac{\mu(i_rR_1-i_gR_2+i_pR_L)}{R_1+R_p+R_L}$$

That is:

$$i_p\left(1-\frac{\mu R_L}{R_1+R_p+R_L}\right)=\frac{\mu(i_rR_1-i_gR_2)}{R_1+R_p+R_L}$$

Therefore:

$$i_p=\frac{\mu(i_rR_1-i_gR_2)}{(R_1+R_p+R_L)\left(1-\frac{\mu R_L}{R_1+R_p+R_2}\right)}$$

Let:

$$(R_1+R_p+R_L)\left(1-\frac{\mu R_L}{R_1+R_p+R_2}\right)=K_1$$

Therefore:

$$i_p=\frac{\mu(i_rR_1-i_gR_2)}{K_1}$$

On the other hand:

$$i_g=gm_gl_g$$

and:

$$l_g=i_pR_L$$

Therefore:

$$i_g=gm_g\cdot i_p\cdot R_L$$
$$=gm_g\cdot\frac{\mu(i_rR_1-i_gR_2)R_L}{K_1}$$

That is:

$$i_g\left(1+\frac{gm_g\mu R_LR_2}{K_1}\right)=\frac{gm_g\mu i_rR_1R_L}{K_1}$$

Therefore:

$$\frac{i_g}{i_r}=\frac{gm_g\mu R_1R_L}{K_1\left(1+\frac{gm_g\mu R_LR_2}{K_1}\right)} \quad (11)$$

But $$\frac{gm_g\mu R_LR_2}{K_1}$$

is the grid to plate gain of device 20 with degeneration due to $R_1$ taken into account, and may be made much greater than 1. Therefore Equation 11 reduces substantially to the following:

$$\frac{i_g}{i_r}=\frac{gm_g\mu R_1R_L}{gm_g\mu R_2R_L}$$
$$=\frac{R_1}{R_2}$$

Therefore, the current flow through reproducing device 10 controls the current flow through device 11, and these currents may have any selected proportion as determined by the values $R_1$ and $R_2$ of resistors 17 and 18. Should the mutual conductance of reproducing device 10 vary and increase the current therein so that device 10 tends to contribute a disproportionate share of its color to the synthesized image, such curent increase produces a corresponding increase in the curent flow in reproducing device 11 to increase the latter's color contribution proportionately to maintain the proper color hues in the final image. On the other hand, should the mutual conductance of reproducing device 11 vary and tend to cause a corresponding variation in the current through that device, such a tendency varies the signal applied to control electrode 21 of device 20 which, in turn, produces a compensating variation in the signal applied to control electrode 14 of reproducing device 11 to oppose any variation in current flow through device 11 as a result of such tendency. In this manner, it is assured that the proportionate current flow in the two reproducing devices, as established by resistors 17 and 18, is maintained at a selected constant ratio despite changes in the mutual conductance in either of the devices so that when the devices are used in a color receiver, each contributes the proper proportion to the final color image and obviates color contamination.

The circuit of Fig. 2 is essentially similar to that of Fig. 1, with the exception that three cathode-ray image reproducing devices are shown, each device contributing one of three color components to a final color image. In this figure, reproducing device 10 is assumed to constitute the red image reproducing device, whereas reproducing device 11 is assumed to constitute the green image reproducing device. A further reproducing device 30 is included which is assumed to constitute the blue image reproducing device. Reproducing device 30 has a control electrode 31 and a cathode 32. The cathode is connected to a point of reference potential through a resistor 33 and to the control electrode 34 of an electron discharge device 35. Discharge device 35 has a cathode 36 connected to cathode 19 of discharge device 20, and also has an anode 37 which is connected to the positive terminal B+ of a unidirectional potential source through a load resistor 38 and to control electrode 31 of reproducing device 30.

Assuming that the circuit of Fig. 2 represents a portion of a color television receiver which is tuned to a monochrome television signal, such signal is detected by the receiver which supplies a monochrome video signal to terminal 16 for application to control electrode 12 of the red image reproducing device 10. In this manner, the cathode-ray beam in the red reproducing device is controlled in accordance with the monochrome signal. It is desired that the green and blue reproducing devices be likewise controlled by the monochrome signal in a selected proportionate relation with each other and the red device so that the final image may appear as black-and-white. This is achieved by the control circuit of the invention in which red reproducing device 10 controls green reproducing device 11 in the manner explained in conjunction with Fig. 1 and, likewise, reproducing device 10 controls the blue reproducing device 30 by the control circuit including discharge device 35 in the same manner. The relation between the beam current in devices 10 and 11 may be controlled by the suitable selection of resistors 17 and 18 to produce the desired proportion. Likewise, the relation between the beam current in reproducing device 30 may be proportioned to that in devices 10 and 11 by the appropriate selection of resistor 33.

Any variation in the mutual conductance of reproducing device 10 does not cause a red contamination in the resulting monochrome image, but produces a proportionate variation in the beam currents in devices 11 and 30 so that a true monochrome image is retained. Likewise, any tendency for the beam currents in devices 11 and 12 to increase due to variations in the mutual conductance of these devices is compensated by the respective action of devices 20 and 35 in the manner previously described.

The color television receiver system of Fig. 3 is constructed to operate in the orange-cyan color television system referred to previously herein. The receiver system includes the color television receiver unit 50 having input terminals connected to an antenna circuit 51, 52. Receiver unit 50 utilizes an orange-cyan color television signal intercepted by antenna circuit 51, 52 and demodulates that signal to produce the ($y$) modulation component on lead 53 together with the two like frequency but phase quadrature modulated subcarrier components, the latter being modulated by color information respectively designated as "I" and "Q." The orange-cyan color television signal also includes a reference signal which may have the phase of the "I" subcarrier and this reference signal is recovered in the receiver and supplied to lead 54. Should standards prescribe another phase for the reference signal, it may be brought to the "I" phase on lead 54 by any suitable phase shifting network.

Lead 53 is connected through an adder network 55 to the control electrode 12 of the red image reproducing device 10, and is also connected through a bandpass filter 56 to a demodulator 57 for the "I" subcarrier component and to a demodulator 58 for the "Q" subcarrier component. Lead 54 is connected to demodulator 57, and this lead is connected through a 90° phase shifter 59 to demodulator 58.

Demodulators 57 and 58 are connected to a mixer 60 through leads 61, 62 and 63, 64 respectively. Mixer 60 is connected to a subtractor network 65 by leads 66 and 67, to a subtractor network 68 by leads 69 and 70, and to adder 55 by lead 71.

The operation of the receiver thus far described is as follows: Lead 53 applies the "I" subcarrier and phase-quadrature "Q" subcarrier through bandpass filter 56 to demodulators 57 and 58. The "I" subcarrier is demodulated in demodulator 57 in response to the "I" reference signal from lead 54. Likewise, the "Q" subcarrier is demodulated in demodulator 58 in response to the "Q" reference which is obtained by phase shifting the "I" reference by 90° in phase shifter 59. The "I" demodulator 57 produces the "I" modulation components with positive polarity on lead 61 and with negative polarity on lead 62, whereas the "Q" demodulator 58 produces the "Q" modulation components with positive polarity on lead 63 and with negative polarity on lead 64. Mixer 60 responds to the modulation components on leads 61, 62, 63 and 64 to produce color difference signals ($r—y$), ($g—y$), ($b—y$) on leads 66, 67 and 70 respectively. Details of suitable demodulators 57 and 58 and of an appropriate mixer 60 are described in detail in copending application Serial No. 322,763 filed November 26, 1952, in the name of Kurt Schlesinger and assigned to the present assignee. The circuits constituting these units per se form no part of the present invention and for that reason are not described in detail herein.

The ($r—y$) color difference signal on lead 66 is supplied to adder 55 over lead 71 and added with the monochrome signal ($y$) therein to produce a color signal ($r$) which is applied to the control electrode 12 of red image reproducing device 10. The ($r—y$) color difference signal on lead 66 and the ($g—y$) color difference signal on lead 67 are subtracted in subtractor network 65, which network applies a ($g—r$) color difference signal to the control electrode of an electron discharge device 72. The ($r—y$) color difference signal on lead 66 is supplied to subtractor 68 by lead 69 and subtracted therein from the ($b—y$) color difference signal supplied to subtractor 68 over lead 70. The resulting ($b—r$) color difference signal from subtractor 68 is applied to the control electrode of an electron discharge device 73.

Cathode 30 of red reproducing device 10 is coupled to the green reproducing device 11 through discharge device 20 as in Fig. 2, however, the connection is made indirectly through an electron discharge device 74; cathode 13 of reproducing device 10 being connected to the control electrode of device 74, the anode of device 74 being connected directly to the positive terminal B+ of a unidirectional potential source, and its cathode being connected to cathode 19 of device 20. Subtractor 64 is connected, as previously stated, to the control electrode of discharge device 72. The anode of device 72 is connected to the positive terminal B+ of a unidirectional potential source, and its cathode is connected (together with the cathode of device 74) to cathode 19 of discharge device 20.

Cathode 13 of red image reproducing device 10 is connected to the blue reproducing device 30 through discharge device 35, as in the circuit of Fig. 2, but the connection is made indirectly through an electron discharge device 75. Cathode 13 is connected to the control electrode of the latter device. The anode of device 75 is connected to the positive terminal B+ of a source of unidirectional potential, and its cathode is connected to cathode 36 of discharge device 35. As previously pointed out, the output of subtractor 68 is connected to the control electrode of discharge device 73, and the anode of device 73 is connected to the positive terminal B+ of a source of unidirectional potential and its cathode is connected to cathode 36 of discharge device 35 together with the cathode of discharge device 75.

In the circuit of Fig. 3, cathode resistors 17, 18 and 33, instead of being connected directly to ground, are respectively connected to movable taps on resistors 76, 77 and 78 which are connected as potentiometers between the positive terminal B+ of a unidirectional potential source and ground.

During normal operation of the system, adder 55 supplies the red signal to the control electrode 12 of red image reproducing device 10 so that this device reproduces the red intelligence. The application of the red signal to control electrode 12 produces a corresponding red signal across cathode resistor 17, and the latter signal is applied to the control electrode of discharge device 75 and appears across cathode resistor 17″. Subtractor 68 applies a ($b—r$) color signal to the control electrode of discharge device 73 which also appears across resistor 17″ and adds with the red signal so that a resulting blue signal is applied to cathode 36. The blue signal on cathode 36 is translated through discharge device 35 to the control electrode 31 of the blue image reproducing device 30, and is applied to that control electrode so that the blue device reproduces the blue intelligence. Likewise, the red signal across cathode resistor 17 is applied to the control electrode of discharge device 74 and appears across cathode resistor 17'. At the same time, subtractor 65 supplies a (*g*—*r*) color difference signal to the control electrode of discharge device 72 which also appears across resistor 17'. The latter signal adds with the red signal to produce a resulting green signal on cathode 19 of discharge device 20, the green signal being translated by device 20 to the control electrode 14 of green image reproducer 11 so that the image reproducer reproduces the green intelligence. In this manner, when television receiver 50 utilizes the color television signal, the various color components of the signal are fed to the respective reproducing devices, and each reproducing device contributes its proportionate share to the color of the final synthesized image.

Should the mutual conductance of the red reproducer 10 vary tending to alter the current through the red reproducer and produce red color contamination, such an alteration produces a variation in the (*r*) signal across cathode resistor 17 so that full cancellation does not occur across cathode resistor 17' and 17'' and the current in the green reproducing device 11 and blue reproducing device 30 are also altered proportionately to compensate for such color contamination. This latter action is essentially similar to the action previously explained in conjunction with Figs. 1 and 2.

Should the receiver be tuned to a monochrome television signal, only a (*y*) signal is applied to the red reproducer, and no signal is applied either to the blue or green reproducers from subtractors 65 and 68. Under these conditions, the circuit functions in the identical manner to that of Fig. 2, with the signal applied to the red reproducer producing the proper proportionate current in the green and blue reproducers to obtain a black and white image free from color contamination.

Devices 72, 73, 74 and 75 are included in the circuit of Fig. 3 to prevent the color difference signals from subtractor 65 and 68 reaching any but the proper reproducing devices, and yet enabling the current flow in the red reproducer 10 to control the current in the blue and green reproducers in accordance with the principles of the circuit described in Figs. 1 and 2. Suitable preliminary adjustments of current proportion in the various devices can be effected by varying the taps on potentiometer 76, 77 and 78. Resistors 17, 18 and 33 are given proper values to produce, in accordance with the equations set out previously herein, the correct proportions of beam currents in the reproducing devices.

The invention provides, therefore, a new and improved color television receiver which incorporates a control circuit for controlling the current flow in the various reproducing devices to assure that proper reproduction is achieved at all times for monochrome signals and that color signals may be reproduced free from color contamination despite variations in the characteristics of the various reproducing devices.

It is again pointed out that, although the image reproducing devices 10, 11 and 30 have been illustrated and described as separate one from the other, these devices may take the form of different electron guns within a single envelope to constitute a well-known form of color image reproducer.

While a particular embodiment of the invention has been shown and described, modifications may be made, and it is intended in the appended claims to cover all such modifications as fall within the true spirit and scope of the invention.

I claim:

1. In a television receiver, the combination of image reproducing means including at least a first cathode-ray beam section and a second cathode-ray beam section; first and second electrodes in each of said sections for controlling the intensity of the cathode-ray beam therein; means for impressing a signal on said first electrode of said first section; first and second impedance elements respectively connecting said second electrodes of said first and second sections to a point of reference potential; and a discharge device having one element connected to said first electrode of said second section, having another element connected to one of said second electrodes, and having yet another element connected to the other of said second electrodes, so that current variations of said first cathode-ray beam produce corresponding current variations in said second cathode-ray beam in a proportion determined by the values of said impedance elements.

2. In a television receiver, the combination of image reproducing means including at least a first cathode-ray beam section and a second cathode-ray beam section; first and second electrodes for each of said sections for controlling the intensity of the cathode-ray beam therein; means for impressing a signal on said first electrode of said first section; first and second resistance means respectively connecting said second electrodes of said first and second sections to a point of reference potential; third resistance means for connecting said first electrode of said second section to a source of positive unidirectional potential; and an electron discharge device having an anode connected to said first electrode of said second section, having a cathode connected to said second electrode of said first section, and having a control electrode connected to said second electrode of said second section, so that current variations of said first cathode-ray beam produce corresponding variations in said second cathode-ray beam in a proportion determined by the values of said first and second resistance means.

3. A receiver for utilizing a modulated television wave signal including in combination, at least first and second cathode-ray image reproducing devices each having a cathode and a control electrode; means for demodulating the aforesaid television signal and for supplying a component of the resulting demodulated signal to the control electrode of said first device to control the beam current therein; first and second resistors respectively connecting the cathodes of said first and second devices to a point of reference potential; an electron discharge device having an anode, a cathode and a control electrode; means for impressing signals appearing across said first resistor on the cathode of said discharge device; means for impressing signals appearing across said second resistor on the control electrode of said discharge device, an output circuit for said discharge device connected to the anode thereof; and means for impressing signals appearing across said output circuit on the control electrode of said second image reproducing device, thereby to establish a beam current in said second reproducing device having a selected relation with the beam current in said first reproducing device determined by the ratio of the values of said resistors.

4. A receiver for utilizing a modulated color television signal including in combination, color image reproducing means including a red-image discharge device, a green-image discharge device, and a blue-image discharge device, each of said devices having a cathode and a control electrode; means for demodulating the aforesaid color television signal and for applying a component of the resulting demodulated signal to the control electrode of said red-image discharge device to control the discharge current therein; first, second and third resistors respectively connecting the cathodes of said red-, green- and blue-image discharge devices to a point of reference potential; a first electron discharge device having an anode, a cathode and a control electrode; means for impressing signals appearing across said first resistor on the cathode of said electron discharge device; means for impressing signals appearing across said second resistor on the control electrode of said electron discharge device; an output circuit for said electron discharge device connected to the anode thereof, means for impressing signals appearing across said output circuit on the control electrode of said green-image discharge device; a second electron discharge device having an anode, a cathode and a control electrode; means for impressing signals appearing across said first resistor on the cathode of said second electron discharge device; means for impressing signals appearing across said third resistor on the control electrode of said second electron discharge device; an output circuit for said second electron discharge device connected to the anode thereof; and means for impressing signals appearing across said last-mentioned output circuit on the control electrode of said blue-image discharge device, thereby to establish beam currents in said green- and blue-image discharge devices each having a selected relation with the beam current in said red-image discharge device determined by the ratios of the values of said resistors.

5. A receiver for utilizing a modulated color television wave signal which includes a pair of color-signal modulation components, said receiver including in combination, circuit means for demodulating the aforesaid television signal and for recovering the aforesaid color-signal modulation components, network means for combining signals from said circuit means to produce a first signal representing a first color component and a second signal representing the difference between a second color component and said first color component; image reproducing means including first and second cathode-ray beam discharge devices each having a cathode and a control electrode; means for supplying said first signal to the control electrode of said first device to control the beam current therein; a pair of resistor means respectively connecting the cathodes of said devices to a point of reference potential; a control network intercoupling the cathode of said first device to the cathode and control electrode of said second device to establish a beam current in said second device having a selected relation with the beam current in said first device determined by the ratio of the values of said resistors; and means for applying said second signal to said control network thereby to control the beam current in said second device in accordance with the sum of said first and second signals.

6. A receiver for utilizing a modulated color television wave signal which includes a pair of color-signal modulation components, said receiver including in combination, circuit means for demodulating the aforesaid television signal and for recovering the aforesaid color-signal modulation components; network means for combining signals from said circuit means to produce a first signal representing a red color component, a second signal representing a green minus red color component, and a third signal representing a blue minus red color component; color-image reproducing means including a red-image beam discharge device, a green-image beam discharge device, and a blue-image beam discharge device, each of said beam discharge devices having a cathode and a control electrode; means for supplying said first signal to the control electrode of said red-image discharge device to control the beam current therein; first, second and third resistors respectively connecting the cathodes of said red-, green- and blue-image discharge devices to a point of reference potential; a first control network intercoupling the cathode of said red-image discharge device with the cathode and control electrode of said green-image discharge device to establish a beam current in said green-image discharge device having a selected relation with the beam current in said red-image discharge device determined by the ratio of the values of said first and second resistors; means for applying said second signal to said control network thereby to control the beam current in said green-image discharge device in accordance with the sum of said first and second signals; a second control network intercoupling the cathode of said red-image discharge device with the cathode and control electrode of said blue-image discharge device to establish a beam current in said blue-image discharge device having a selected relation with the beam current in said red-image discharge device determined by the ratio of the values of said first and third resistors; and means for applying said third signal to said second control network thereby to control the beam current in said blue-image discharge device in accordance with the sum of said first and third signals.

References Cited in the file of this patent

UNITED STATES PATENTS

| | | |
|---|---|---|
| 2,558,489 | Kalfaian | June 26, 1951 |
| 2,566,693 | Cherry | Sept. 4, 1951 |
| 2,566,707 | Sziklai | Sept. 4, 1951 |
| 2,681,381 | Creamer | June 15, 1954 |